US012392276B2

(12) United States Patent
Lohmann et al.

(10) Patent No.: US 12,392,276 B2
(45) **Date of Patent: *Aug. 19, 2025**

(54) WORK VEHICLE COMPRESSION IGNITION POWER SYSTEM WITH INTAKE HEAT EXCHANGER

(71) Applicant: Deere & Company, Moline, IL (US)

(72) Inventors: Craig W. Lohmann, Cedar Falls, IA (US); Jacob M. Rosswurm, Raymond, IA (US); Scott R. Miles, Cedar Falls, IA (US); David A. Arntz, Waterloo, IA (US); Darrin L. Treptow, Dunkerton, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,313

(22) Filed: Sep. 6, 2023

(65) Prior Publication Data

US 2024/0141824 A1 May 2, 2024

Related U.S. Application Data

(63) Continuation of application No. 17/975,399, filed on Oct. 27, 2022, now Pat. No. 11,795,869.

(51) Int. Cl.

*F02B 29/04* (2006.01)
*F02B 37/00* (2006.01)
(Continued)

(52) U.S. Cl.

CPC ........ *F02B 29/0443* (2013.01); *F02B 37/004* (2013.01); *F02B 37/013* (2013.01);
(Continued)

(58) Field of Classification Search

CPC . F01N 2270/00; F02B 29/0443; F02M 26/08; F02M 26/19; F02D 41/0077
See application file for complete search history.

(56) References Cited

U.S. PATENT DOCUMENTS

| | | | |
|---|---|---|---|
| 3,266,234 | A | 8/1966 | Cook |
| 4,561,253 | A | 12/1985 | Curtil |

(Continued)

FOREIGN PATENT DOCUMENTS

| | | | |
|---|---|---|---|
| BR | 102023023482 | A2 | 7/2024 |
| CN | 1079533 | A | 12/1993 |

(Continued)

OTHER PUBLICATIONS

USPTO Final Office Action issued in U.S. Utility U.S. Appl. No. 18/177,514 dated Dec. 1, 2023.

(Continued)

*Primary Examiner* — Ngoc T Nguyen
(74) *Attorney, Agent, or Firm* — KLINTWORTH & ROZENBLAT LLP

(57) ABSTRACT

The power system includes a compression ignition engine configured to combust intake gas; an intake arrangement configured to intake charge air; an exhaust arrangement to receive a first portion of the exhaust; an EGR arrangement to receive a second portion of the exhaust as EGR gas; a first mixer to selectively mix a first portion of the EGR gas and the charge air as mixed gas; an intake heat exchanger positioned upstream or downstream of the first mixer and respectively configured to receive one of the intake charge air or the mixed gas such that heat is exchanged with engine coolant; a second mixer positioned downstream of the first mixer and the intake heat exchanger and configured to selectively mix a second portion of the EGR gas and the
(Continued)

mixed gas to form the intake gas; and an intake manifold configured to direct the intake gas into the engine.

20 Claims, 4 Drawing Sheets

(51) Int. Cl.

| | |
|---|---|
| ***F02B 37/013*** | (2006.01) |
| ***F02D 41/00*** | (2006.01) |
| ***F02M 26/08*** | (2016.01) |
| ***F02M 26/09*** | (2016.01) |
| ***F02M 26/22*** | (2016.01) |
| ***F02M 26/23*** | (2016.01) |
| ***F02M 35/10*** | (2006.01) |

(52) U.S. Cl.

CPC ......... *F02D 41/0077* (2013.01); *F02M 26/08* (2016.02); *F02M 26/09* (2016.02); *F02M 26/22* (2016.02); *F02M 26/23* (2016.02); *F02M 35/10222* (2013.01); *F02M 35/10262* (2013.01)

(56) References Cited

U.S. PATENT DOCUMENTS

| | | | |
|---|---|---|---|
| 5,203,830 | A | 4/1993 | Faletti et al. |
| 6,276,334 | B1 | 8/2001 | Flynn et al. |
| 6,321,699 | B1 | 11/2001 | Britton |
| 6,601,563 | B2 | 8/2003 | Funke et al. |
| 7,004,125 | B2 | 2/2006 | Asada |
| 7,152,559 | B2 | 12/2006 | Kuo et al. |
| 7,228,839 | B2 | 6/2007 | Kuo et al. |
| 7,347,171 | B2 | 3/2008 | Leman et al. |
| 7,628,013 | B2 | 12/2009 | Aikawa et al. |
| 7,765,994 | B2 | 8/2010 | Winstead |
| 8,150,582 | B2 | 4/2012 | Blommer et al. |
| 8,406,956 | B2 | 3/2013 | Wey et al. |
| 8,474,258 | B2 | 7/2013 | Mahakul et al. |
| 8,522,756 | B2 * | 9/2013 | Vuk ........................ F02B 33/40 60/278 |
| 8,590,517 | B2 | 11/2013 | Yokoo et al. |
| 8,930,118 | B2 | 1/2015 | Nagatsu et al. |
| 9,316,180 | B2 * | 4/2016 | Heiermann ............ F02M 26/05 |
| 9,512,814 | B2 | 12/2016 | Yamakawa et al. |
| 9,835,065 | B2 | 12/2017 | Jozsa et al. |
| 9,845,109 | B2 | 12/2017 | George et al. |
| 9,903,262 | B2 | 2/2018 | Edwards et al. |
| 10,487,753 | B2 | 11/2019 | Idicheria et al. |
| 10,648,443 | B1 | 5/2020 | Inoue et al. |
| 10,704,436 | B2 | 7/2020 | Jozsa et al. |
| 10,801,430 | B2 | 10/2020 | McCarthy, Jr. et al. |
| 11,199,162 | B2 | 12/2021 | McCarthy, Jr. et al. |
| 11,305,813 | B2 | 4/2022 | Kim |
| 11,536,213 | B2 | 12/2022 | Miles et al. |
| 11,572,673 | B2 | 2/2023 | Dou et al. |
| 11,572,824 | B2 | 2/2023 | Miles et al. |
| 11,635,039 | B1 | 4/2023 | Dou et al. |
| 11,795,869 | B1 * | 10/2023 | Lohmann .............. F02B 37/013 |
| 12,024,247 | B2 | 7/2024 | Schäfer et al. |
| 2003/0200942 | A1 | 10/2003 | Dachtchenko et al. |
| 2004/0045283 | A1 | 3/2004 | Asada |
| 2005/0252464 | A1 | 11/2005 | Aikawa et al. |
| 2006/0016417 | A1 | 1/2006 | Kuo et al. |
| 2006/0016420 | A1 | 1/2006 | Kuo et al. |
| 2006/0086560 | A1 | 4/2006 | Furusho et al. |
| 2007/0119422 | A1 | 5/2007 | Lewis et al. |
| 2007/0204747 | A1 | 9/2007 | Aoyama et al. |
| 2007/0295290 | A1 | 12/2007 | Cao |
| 2007/0295316 | A1 | 12/2007 | Davis et al. |
| 2008/0288157 | A1 | 11/2008 | Winsor et al. |
| 2010/0211264 | A1 | 8/2010 | Wey et al. |
| 2010/0268422 | A1 | 10/2010 | Blommer et al. |
| 2011/0247584 | A1 | 10/2011 | Gentile |
| 2011/0315128 | A1 | 12/2011 | Yokoo et al. |
| 2013/0019828 | A1 | 1/2013 | Nagatsu et al. |
| 2013/0047958 | A1 | 2/2013 | Yamakawa et al. |
| 2013/0180485 | A1 | 7/2013 | Kamio |
| 2015/0040560 | A1 | 2/2015 | Jozsa et al. |
| 2015/0300284 | A1 | 10/2015 | Ishida |
| 2015/0330315 | A1 | 11/2015 | Takahashi et al. |
| 2015/0354437 | A1 | 12/2015 | Mulye |
| 2016/0010576 | A1 * | 1/2016 | Primus ................ F02D 41/0052 701/104 |
| 2016/0280251 | A1 | 9/2016 | George et al. |
| 2017/0101941 | A1 | 4/2017 | Gladel et al. |
| 2018/0009443 | A1 | 1/2018 | Norstad |
| 2018/0058285 | A1 | 3/2018 | Jozsa et al. |
| 2018/0106204 | A1 | 4/2018 | McCarthy, Jr. et al. |
| 2018/0306098 | A1 | 10/2018 | Edwards et al. |
| 2018/0347476 | A1 | 12/2018 | Idicheria et al. |
| 2019/0040826 | A1 | 2/2019 | McCarthy, Jr. et al. |
| 2019/0389509 | A1 | 12/2019 | Kim |
| 2020/0088081 | A1 | 3/2020 | Rohde et al. |
| 2021/0054777 | A1 | 2/2021 | Blumreiter et al. |
| 2021/0179168 | A1 | 6/2021 | Zeiler |
| 2022/0003184 | A1 | 1/2022 | Blumreiter et al. |
| 2022/0003318 | A1 | 1/2022 | Brushkivskyy et al. |
| 2022/0018297 | A1 | 1/2022 | Blumreiter et al. |
| 2022/0034284 | A1 | 2/2022 | Klingbeil |
| 2022/0048563 | A1 | 2/2022 | Schäfer |
| 2023/0160350 | A1 | 5/2023 | Klingbeil |
| 2024/0067261 | A1 | 2/2024 | Kim |
| 2024/0140525 | A1 | 5/2024 | Maruyama et al. |
| 2024/0141844 | A1 | 5/2024 | Lohmann |

FOREIGN PATENT DOCUMENTS

| | | | |
|---|---|---|---|
| CN | 101023250 | A | 8/2007 |
| CN | 101198771 | A | 6/2008 |
| CN | 101495729 | A | 7/2009 |
| CN | 100567714 | C | 12/2009 |
| CN | 101198771 | B | 6/2010 |
| CN | 101900637 | A | 12/2010 |
| CN | 102312731 | A | 1/2012 |
| CN | 101363378 | B | 7/2012 |
| CN | 102884300 | A | 1/2013 |
| CN | 103026032 | A | 4/2013 |
| CN | 102884300 | B | 7/2015 |
| CN | 103026032 | B | 8/2015 |
| CN | 105408607 | A | 3/2016 |
| CN | 106004994 | A | 10/2016 |
| CN | 106321269 | A | 1/2017 |
| CN | 106004994 | B | 7/2018 |
| CN | 108778900 | A | 11/2018 |
| CN | 107499373 | B | 3/2020 |
| CN | 111365133 | A | 7/2020 |
| CN | 112368470 | A | 2/2021 |
| CN | 108291494 | B | 3/2021 |
| CN | 108474308 | B | 11/2021 |
| CN | 112368470 | B | 3/2023 |
| CN | 116811995 | A | 9/2023 |
| CN | 119226660 | A | 12/2024 |
| DE | 112008001007 | T5 | 2/2010 |
| DE | 112008001087 | T5 | 7/2010 |
| DE | 102011105530 | A1 | 3/2012 |
| DE | 102010064182 | A1 | 6/2012 |
| DE | 102011015696 | A1 | 10/2012 |
| DE | 112011101517 | T5 | 5/2013 |
| DE | 102011105530 | B4 | 11/2015 |
| DE | 102016203027 | A1 | 2/2016 |
| DE | 112008001087 | B4 | 6/2016 |
| DE | 102015206837 | A1 | 10/2016 |
| DE | 102015221809 | A1 | 4/2017 |
| DE | 112015007102 | T5 | 8/2018 |
| DE | 102016105498 | B4 | 6/2020 |
| DE | 112011101517 | B4 | 4/2021 |
| DE | 102020119860 | A1 | 2/2022 |
| DE | 102021208165 | A1 | 2/2022 |
| DE | 112015007102 | B4 | 7/2022 |
| DE | 102021208165 | B4 | 5/2024 |
| DE | 102023128286 | A1 | 5/2024 |
| EP | 2564047 | B1 | 3/2016 |

(56) References Cited

FOREIGN PATENT DOCUMENTS

| | | | |
|---|---|---|---|
| FR | 2918704 | A3 | 1/2009 |
| JP | 2006161799 | A | 6/2006 |
| JP | 2008025534 | A | 2/2008 |
| JP | 2008223537 | A | 9/2008 |
| JP | 2011214477 | A | 10/2011 |
| JP | 5299586 | B2 | 9/2013 |
| JP | 5569100 | B2 | 8/2014 |
| JP | 5902289 | B2 | 4/2016 |
| JP | 2017078337 | A | 4/2017 |
| JP | 6634774 | B2 | 1/2020 |
| KR | 20180041195 | A | 4/2018 |
| KR | 102354453 | B1 | 1/2022 |
| WO | WO9324749 | A1 | 12/1993 |
| WO | WO2006022998 | A2 | 3/2006 |
| WO | WO2006023040 | A1 | 3/2006 |
| WO | WO2009024170 | A1 | 2/2009 |
| WO | WO2011122014 | A1 | 10/2011 |
| WO | WO2011135859 | A1 | 11/2011 |
| WO | WO2017095411 | A1 | 6/2017 |
| WO | WO2017127585 | A1 | 7/2017 |
| WO | WO2018221511 | A1 | 12/2018 |
| WO | WO2020007456 | A1 | 1/2020 |
| WO | 2020232287 | A1 | 11/2020 |
| WO | 2021174016 | A1 | 9/2021 |
| WO | 2022011275 | A1 | 1/2022 |

OTHER PUBLICATIONS

AVL—IWIS—Dual Mode VCS TM at httpswww.youtube.comwatchv=cAlb7wJOUk8, dated Sep. 11, 2017. (1 page).

Clearflame—ClearFlame Engine Technologies Overview at httpswww.youtube, dated May 18, 2020. (1 page).

Clearflame—SAE Chicago Presents: ClearFlame Engine Technologies at httpswww.youtube.comwatchv=fAlMtoIU2B8, dated Mar. 2021. (1 page).

FEV—VCR Conrod Coupled Simulation at httpswww.youtube.comwatchv=30sEeZ54X_s, dated May 23, 2017. (1 Page).

FEV—Explore FEV's VCR Conrod at httpswww.youtube.comwatchv=ABNZY3Enykg, dated Apr. 24, 2015. (1 page).

Wikipedia—Glow plug (diesel engine) at https://en.wikipedia.org/wiki/Glow_plug_(diesel_engine), undated, admitted prior art. (2 pages).

Nissan—Nissan VC Turbo Engine (Variable Compression Turbo) at https://www.youtube.com/watch?v=YPDXgAWhrs4, dated Mar. 30, 2018. (4 pages).

Utility U.S. Appl. No. 17/975,399, filed Oct. 27, 2022.

Utility U.S. Appl. No. 17/977,016, filed Oct. 31, 2022.

Utility U.S. Appl. No. 18/145,524, filed Dec. 22, 2022.

Utility U.S. Appl. No. 18/145,536, filed Dec. 22, 2022.

Utility U.S. Appl. No. 18/177,514, filed Mar. 2, 2023.

Non-Final Office Action issued in Utility U.S. Appl. No. 18/177,514 dated Jun. 27, 2023.

USPTO Non-Final Office Action issued in Utility U.S. Appl. No. 17/977,016 dated Feb. 16, 2024.

USPTO Non-Final Office Action issued in Utility U.S. Appl. No. 18/145,536 dated Dec. 19, 2023.

USPTO Non-Final Office Action issued in Utility U.S. Appl. No. 18/145,524 dated Mar. 13, 2024.

U.S. Department of Energy: Energy Efficiency & Renewable Energy (EERE), Alternative Fuels Data Center, Flexible Fuel Vehicles, https://afdc.energy.gov/vehicles/flexible-fuel, Apr. 7, 2024.

John Deere: "Future Farming, John Deere presents ethanol engine at Agritechnica", https://www.futurefarming.com/tech-in-focus/john-deere-presents-ethanol-engine-at-agritechnica/, Oct. 30, 2023.

Ethanol Producer Magazine: "Vale, Komatsu and Cummins announce collaboration to develop Dual Fuel large trucks, powered by ethanol and diesel", https://ethanolproducer.com/articles/vale-komatsu-and-cummins-announce-collaboration-to-develop-dual-fuel-large-trucks-powered-by-ethanol-and-diesel/, Jul. 16, 2024 by Vale.

MAN Energy Solutions: "Methanol-ready four-stroke engines", https://www.man-es.com/marine/products/four-stroke-engines/methanol-ready-engines/, Dec. 10, 2023.

ClearFlame Engine Technologies: Diesel Engine Aftertreatment, "Our Technology, Reduce emissions and lower your cost of ownership with ClearFlame's clean engine technology", https://clearflame.com/technology/, Sep. 26, 2022.

SAE International: Heavy-Duty Diesel Sustainable Transport Symposium, Application of Westport Fuel Systems' HPDI Technology to a Demonstration Truck, Gothenburg, Sweden, (Westport Fuel Systems), https://www.sae.org/attend/heavy-duty-sustainable-transport-symposium, May 3-4, 2023.

Cummins Inc.: "Dual Fuel Engines for Drilling" (Natural Gas), https://www.cummins.com/engines/drilling/dual-fuel-engines-drilling, Sep. 18, 2018.

U.S. Department of Energy: Curan, Scott et al., Oak Ridge National Laboratory (ORNL), "Ammonia for 4-stroke Marine Dual Fuel and Gas Engines (Retrofits and New)", DOE Vehicle Technologies Office Annual Merit Review, Project ID: DORMA046, Jun. 2024.

SAE International WCX 2024, (Miles, Paul): Year-in-Review on Emissions, Fuels, and Propulsion Engines for Heavy-Duty and Off-Road Applications, Sandia National Laboratories Combustion Research Facility, Livermore, CA, SAE WCX Apr. 16-18, 2024.

Non-Final Office Action issued in U.S. Appl. No. 18/796,035 dated Jan. 29, 2025.

* cited by examiner

WORK VEHICLE COMPRESSION IGNITION POWER SYSTEM WITH INTAKE HEAT EXCHANGER

CROSS-REFERENCE TO RELATED APPLICATION(S)

This application is a continuation of U.S. patent application Ser. No. 17/975,399, filed Oct. 27, 2022, now allowed, which is incorporated herein in its entirety.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. For many work vehicles, the power system includes a diesel engine that may have higher lugging, pull-down, and torque characteristics for associated work operations. However, diesel and other types of fossil fuel-based engines may generate undesirable emissions.

Ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are generally not suitable for use in heavy work applications.

SUMMARY OF THE DISCLOSURE

The disclosure provides a work vehicle compression ignition power system with an intake heat exchanger to facilitate ignition and support operation in a range of conditions.

In one aspect, the disclosure provides a power system for a work vehicle. The power system includes a compression ignition engine configured to receive and combust intake gas to generate mechanical power and exhaust; an intake arrangement configured to intake charge air; an exhaust arrangement configured to receive a first portion of the exhaust generated by the compression ignition engine; an EGR (exhaust gas recirculation) arrangement configured to receive a second portion of the exhaust generated by the compression ignition engine as EGR gas; a first mixer configured to selectively receive and mix a first portion of the EGR gas and the charge air as mixed gas; an intake heat exchanger positioned either upstream of the first mixer or downstream of the first mixer and respectively configured to receive one of the intake charge air or the mixed gas such that heat is exchanged between with engine coolant circulating in the intake heat exchanger and the one of the intake charge air or the mixed gas; a second mixer positioned downstream of the first mixer and the intake heat exchanger and configured to selectively receive and mix a second portion of the EGR gas and the mixed gas to form the intake gas; and an intake manifold configured to receive and direct the intake gas from the second mixer into the compression ignition engine for combustion.

The compression ignition engine is configured to operate with a low cetane fuel.

The compression ignition engine is configured to operate with fuel having a cetane value of less than 40.

The intake heat exchanger is positioned downstream of the first mixer such that the heat is exchanged with engine coolant circulating in the intake heat exchanger and the mixed gas.

Under a first set of conditions, the intake heat exchanger is configured to heat the mixed gas.

Under a second set of conditions, the intake heat exchanger is configured to cool the mixed gas.

The power system further includes: a first EGR valve configured to control an amount of the first portion of the EGR gas directed to the first mixer; and a second EGR configured to control an amount of the second portion of the EGR gas directed to the second mixer.

The power system further includes a controller coupled to the first EGR valve and the second EGR valve and configured to control the first EGR valve and the second EGR valve such that the intake gas has a temperature such that, upon compression, the intake gas auto-ignites.

The intake arrangement includes at least one compressor configured to receive and compress the intake charge air upstream of the first mixer.

The exhaust arrangement includes at least one turbine driven by the first portion of the exhaust and rotationally coupled to drive the at least one compressor.

The intake arrangement includes two compressors and the exhaust arrangement includes two turbines that collectively form dual turbochargers.

The intake arrangement further includes an interstage cooler positioned in between the two compressors to cool the intake charge air.

The power system further includes a radiator configured to cool the engine coolant.

The EGR arrangement further includes an EGR cooler configured to cool the EGR gas upstream of the first mixer.

The EGR cooler and the intake heat exchangers are separate heat exchangers.

In a further aspect, the disclosure provides a work vehicle with a chassis; a drive assembly supported on the chassis; and a power system supported on the chassis and configured to power the drive assembly. The power system includes: a compression ignition engine configured to receive and combust intake gas to generate mechanical power and exhaust; an intake arrangement configured to intake charge air; an exhaust arrangement configured to receive a first portion of the exhaust generated by the compression ignition engine; an EGR (exhaust gas recirculation) arrangement configured to receive a second portion of the exhaust generated by the compression ignition engine as EGR gas; a first mixer configured to selectively receive and mix a first portion of the EGR gas and the charge air as mixed gas; an intake heat exchanger positioned either upstream of the first mixer or downstream of the first mixer to respectively configured to receive one of the intake charge air or the mixed gas such that heat is exchanged between with engine coolant circulating in the intake heat exchanger and the one of the intake charge air or the mixed gas; a second mixer positioned downstream of the first mixer and the intake heat exchanger and configured to selectively receive and mix a second portion of the EGR gas and the mixed gas to form the intake gas; and an intake manifold configured to receive and direct the intake gas from the second mixer into the compression ignition engine for combustion.

The compression ignition engine is configured to operate with a low cetane fuel.

The compression ignition engine is configured to operate with fuel having a cetane value of less than 40.

The intake heat exchanger is positioned downstream of the first mixer such that the heat is exchanged between with engine coolant circulating in the intake heat exchanger and the mixed gas. Under a first set of conditions, the intake heat exchanger is configured to heat the mixed gas; and under a second set of conditions, the intake heat exchanger is configured to cool the mixed gas.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
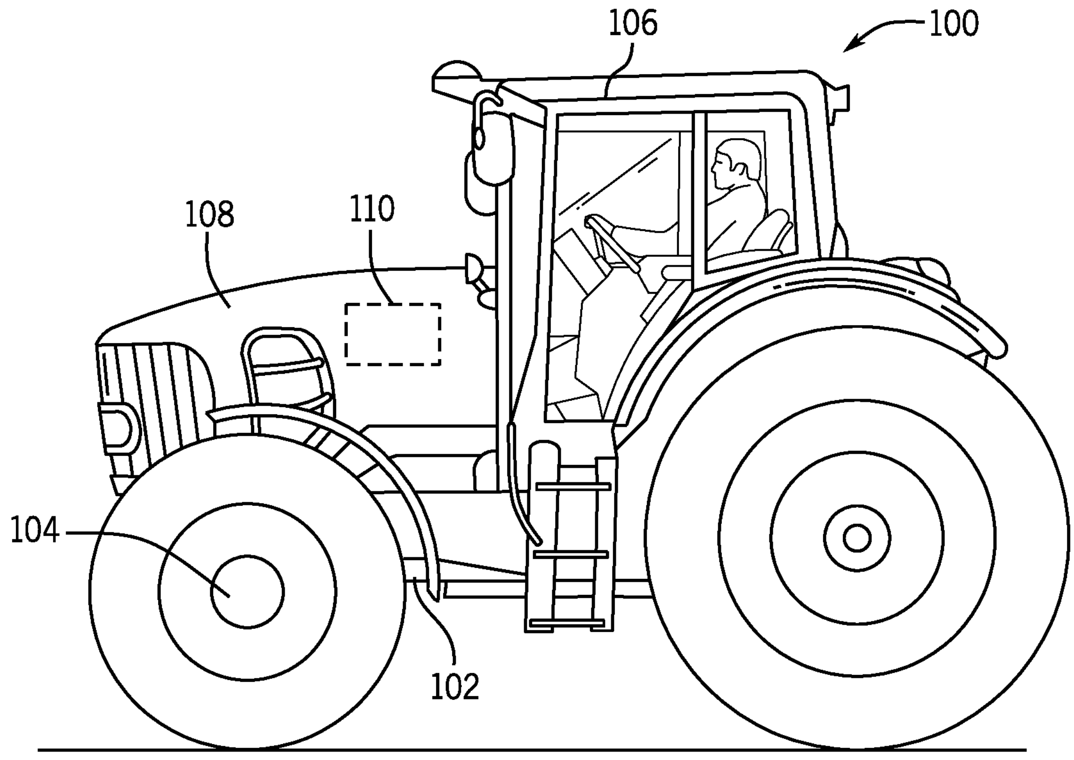
FIG. 1 is a simplified side view of an example work vehicle in the form of a tractor in which a power system may be used in accordance with an embodiment of this disclosure.

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel and other types of fossil fuel-based engines may generate undesirable emissions. In contrast, ethanol, derived from renewable resources such as corn or sugar cane, has been used as a fuel source to reduce greenhouse gas emissions. Typically, within the general consumer automotive markets, ethanol is blended into gasoline and used by spark ignited engines. However, this type of use and such engines are typically not suitable for in heavy work applications.

Generally, certain non-diesel fuels that have desirable sourcing, performance, and/or emission characteristics may have relatively low cetane numbers. A cetane number (or cetane value) is an indicator of the combustion speed of fuel and compression needed for ignition. The scale for measuring cetane numbers ranges from 0 to 100 with higher numbers indicating quicker ignition periods, thereby indicating lower temperatures and pressures required for combustion. In compression combustion engines (e.g., in diesel-type engines), ethanol is generally not used due to its relatively low cetane number (e.g., less than 5) that requires high temperatures for ignition. In other words, compression ignition engines that rely upon ethanol may encounter challenges in cold start and low load conditions in which the temperature is insufficient for reliable ignition. As examples, diesel fuel will reliably auto-ignite inside an engine cylinder at a temperature of about 500 to 600° C., while a fuel such as ethanol requires a temperature of about 850° C. in the cylinder to reliably auto-ignite.

According to examples discussed herein, a power system may include an engine that primarily operates on a low cetane fuel, such as ethanol and other alcohol-based fuels (e.g., methanol, propanol, etc.). Such power systems may include a heat exchanger that operates, under certain conditions, to increase the temperature of the intake air; and under other conditions, to reduce the temperature of the intake air, particularly when mixed with exhaust recirculation (EGR) gas. In some examples, the heating, cooling, and mixing of the charge air and the EGR gas as intake gas for the compression ignition engine may be controlled by a control system.

As discussed herein, an intake heat exchanger may be provided to use engine coolant, along with recirculated exhaust gas, to achieve the desired intake manifold temperatures required for a compression ignition engine to auto-ignite low cetane fuels. This may avoid and/or mitigate the use of excess EGR gas, thereby avoiding issues of control, stability, and undesirable emission characteristics. Such an arrangement and operation enable the use of a low cetane fuel with acceptable ignition and combustion performance in a diesel-type engine. The implementation of low cetane fuels may be facilitated by other aspects of the power system, as discussed in greater detail below.

Generally, as used herein, the term "low cetane fuel" may refer to a fuel with a cetane number (or value) less than that of diesel. For example, a low cetane fuel may have a cetane number of less than 40. One such example is ethanol with a cetane number of approximately 5.

Referring to FIG. 1, in some embodiments, the disclosed power systems and methods that use low cetane fuels may be implemented with a work vehicle 100 embodied as a tractor. In other examples, the disclosed system and method may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. As noted, the engine of the power system 108 may be a compression ignition engine for combustion that may result in improvements in emissions, performance, efficiency, and capability. Moreover, the engine may utilize a low cetane fuel, as introduced above and discussed in greater detail below. Otherwise, the power system 108 may include an intake air arrangement to direct air into the engine and a fuel arrangement to direct fuel (or fuels) into the engine for mixing with the air for combustion, as well as optional additional systems, such as turbocharger and/or exhaust recirculation (EGR) arrangements. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of alcohol (e.g., ethanol) and ether. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the control of alcohol (e.g., ethanol) and/or ether. Although not shown or described in detail herein, the work vehicle 100 may include any number of additional or alternative systems, subsystems, and elements.

Additional information regarding the power system 108, particularly the components associated with fuel and gas flows are provided below. As introduced above and as will now be described in greater detail with reference to FIGS. 2-4, the power system 108 uses a heat exchanger to heat and/or cool charge air and/or a mixture of charge air and EGR gas prior to introduction into the intake manifold of the engine. Such function may enhance ignition and combustion of the low cetane fuel, particularly at low temperature or low load conditions.

Figure 2:
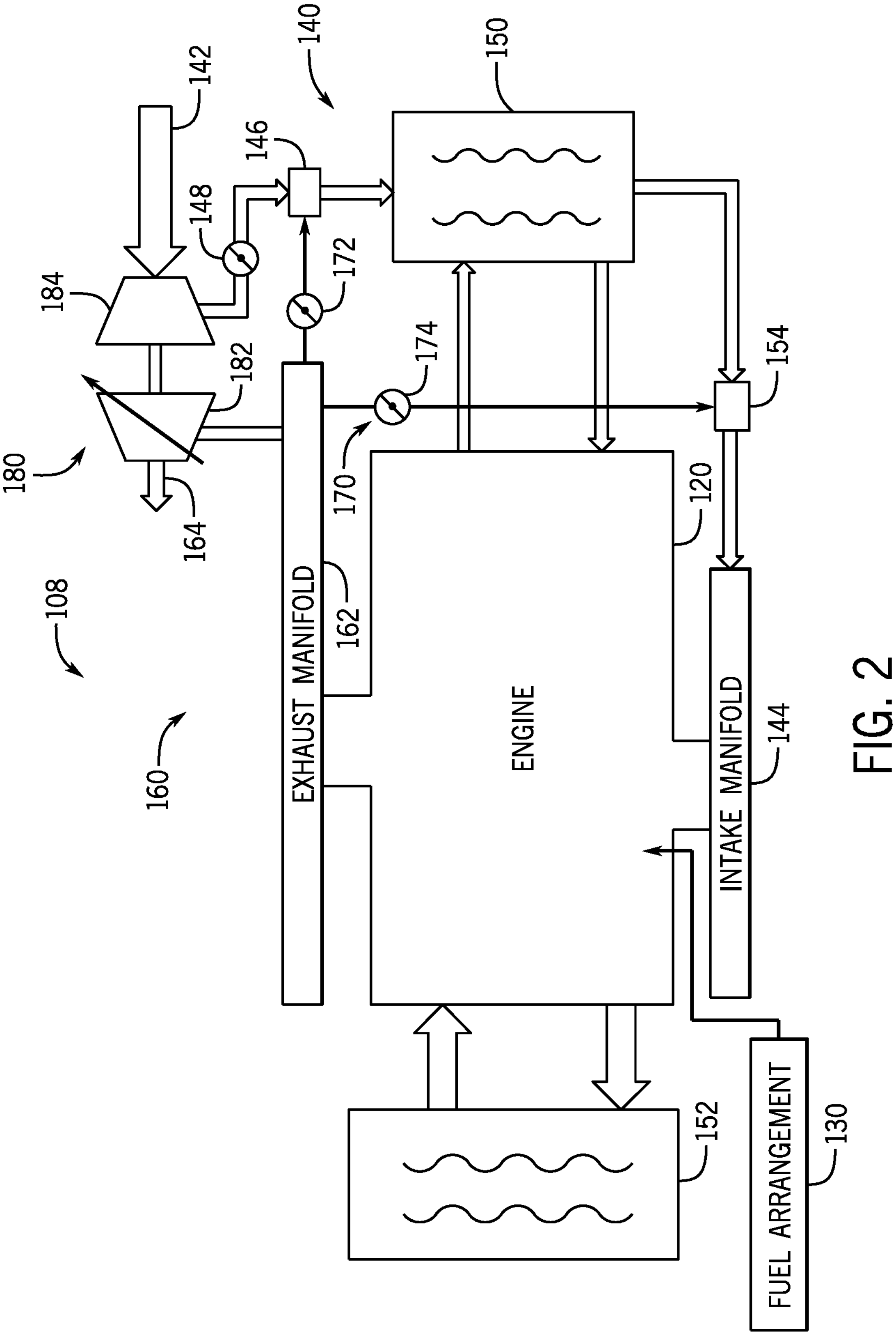
FIG. 2 is a simplified schematic diagram of a power system in accordance with an example embodiment.

Reference is initially made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 includes an engine 120 configured to combust a mixture of fuel from a fuel arrangement 130 and air from an air intake arrangement 140 to generate power for propulsion and various other systems, thereby generating an exhaust gas that is accommodated by an exhaust arrangement 160. As also introduced above, various aspects of the power system 108 may be operated by the controller 110 (FIG. 1) based on operator commands and/or operating conditions. In some examples, the controller 110 may be a dedicated power system controller or a vehicle controller.

As described in greater detail below, the engine 120 is primarily an engine that utilizes low cetane fuels, such as ethanol. Such an engine 120 may be similar to a diesel engine (i.e., compression ignition and combustion) in configuration and arrangement, except that other fuels are combusted instead of diesel. The engine 120 may have any number or configuration of piston-cylinder sets within an engine block. In the illustrated implementation, the engine 120 is an inline-6 (I-6) engine defining six piston-cylinder sets. In addition to those discussed below, the engine 120 may include any suitable feature, such as cooling systems, peripheries, drivetrain components, sensors, etc.

As noted above, the engine 120 is selectively provided fuel for combustion by the fuel arrangement 130, particularly a low cetane fuel, such as ethanol. Generally, the fuel arrangement 130 may include any suitable components to facilitate operation (e.g., pumping, flow control, storage, injection, and the like) of the engine 120 and overall power system 108.

As also noted above, the engine 120 is selectively provided air for combustion by the air intake arrangement 140. The air intake arrangement 140, in this example, includes an intake conduit 142 and an air intake manifold 144. The air intake arrangement 140 directs fresh or ambient air through the air intake conduit 142; and the air intake manifold 144 directs at least a portion of that air into the air intake manifold 144 for introduction into the piston-cylinder sets of the engine block to be ignited with the fuel (e.g., ethanol) such that the resulting combustion products drive the mechanical output of the engine 120. Additional details about the air intake arrangement 140 will be provided below.

The exhaust gas produced from the combustion process of the engine 120 may be received by the exhaust arrangement 160, which includes an exhaust manifold 162 to receive and distribute the exhaust from the piston-cylinder sets. At least a portion of the exhaust gas is directed from the exhaust manifold 162 into an exhaust conduit 164 out of the work vehicle 100, as described in greater detail below. Although not shown in detail, the exhaust gas may flow through one or more exhaust treatment components arranged proximate to the exhaust conduit 164. Such exhaust treatment components may function to treat the exhaust gas passing therethrough to reduce undesirable emissions and may include components such as a diesel oxidation catalyst (DOC), a diesel particulate filter (DPF), a selective catalytic reduction (SCR) system, and the like.

In this example, the power system 108 may include an exhaust gas recirculation (EGR) system 170 and a turbocharger 180, each of which may have at least portions that may also be considered part of (or otherwise cooperate with) the air intake arrangement 140 and/or the exhaust arrangement 160.

Generally, the EGR system 170 is configured to direct at least a first portion of exhaust gas back to the air intake arrangement 140 as EGR gas, i.e., such that a remaining, second portion of the exhaust gas is directed through the turbocharger 180 and out of the vehicle 100 (FIG. 1) via the exhaust conduit 164 as vehicle exhaust, as noted above. Generally, as discussed in greater detail below, the EGR gas may be mixed with charge air (e.g., recirculated back to intake) in order to reduce the formation of NOx during combustion that may otherwise occur. Any suitable amount of exhaust gas may be recirculated (e.g., 10%-20%). The EGR system 170 may include one or more EGR valves 172, 174 that operate to control the various flows of EGR gas and/or exhaust gas. Additional details regarding the EGR gas and/or EGR system 170 are provided below.

The turbocharger 180 generally functions to increase the amount of air subsequently directed into the engine 120 for improved engine efficiency and power output. In one example, the turbocharger 180 includes a turbine 182 that receives a portion (e.g., the second portion) of the exhaust gas, as introduced above. The turbocharger 180 further includes a compressor 184 that is driven by the turbine 182. The compressor 184 functions to compress the ambient or charge air that enters the air intake arrangement 140 via the intake conduit 142. Generally, the turbocharger 180 may be a variable-geometry turbocharger, a wastegate (WG) turbocharger, a fixed turbocharger, and/or any other suitable type of turbocharger.

Returning to the air intake arrangement 140, the compressed charge air from the turbocharger compressor 184 may be directed into a first mixer 146 and mixed with at least a portion (e.g., a first portion) of the EGR gas from the EGR system 170. As shown, the amount of compressed air directed into the first mixer 146 may be controlled by an air throttle valve 148, and the amount of the first portion of EGR gas may be controlled the first EGR valve 172. The relatively hot temperature of the first portion of EGR gas operates to increase the temperature of the charge air in the mixer 146. The mixture of charge air and EGR gas (or "upstream first mixed gas") is directed into an intake heat exchanger 150.

In this example, the intake heat exchanger 150 is configured to direct engine coolant into proximity with the first mixed gas such that the fluids exchange heat with one another. In particular, the intake heat exchanger 150 may be a jacket water (or other coolant) heat exchanger 150 in which engine coolant is received by the intake heat exchanger 150 from the engine 120, placed in proximity with the first mixed gas to facilitate the heat exchange (e.g., in adjacent passages or conduits), and then directed back to the engine 120. In one example, the coolant may be water, although other fluids may be used, including glycol or a mixture of ethylene glycol and water.

Depending on the relative temperatures of the engine coolant and the first mixed gas, the intake heat exchanger 150 may operate as a cooler or a heater relative to the first mixed gas. In other words, when the engine coolant has a high temperature relative to the first mixed gas (e.g., on very cold days, at low loads, or at start-up), the intake heat exchanger 150 may operate as a heater for the first mixed gas; and when the engine coolant has a relatively low temperature relative to the first mixed gas (e.g., on warm days, at high loads, or after prolonged operation), the intake heat exchanger 150 may operate as a cooler for the first mixed gas. Additional information regarding the heating and/or cooling of the first mixed gas by the intake heat exchanger 150 will be provided below.

Briefly, the power system 108 may additionally include a second heat exchanger (or radiator) 152 to facilitate cooling of the engine 120 via circulation of the coolant over a cooling mechanism, such as air-cooled fins. The coolant of the second heat exchanger 152 may be on the same cooling circuit as the coolant of the first heat exchanger 150, or the first and second heat exchangers 150, 152 may be on separate cooling circuits.

Returning to the air intake arrangement 140, downstream of the intake heat exchanger 150, the first mixed gas (or "downstream first mixed gas") is directed into a second mixer 154, which selectively additionally receives a further portion (or second portion) of EGR gas. The amount of second portion of EGR gas directed to the second mixer 154 may be controlled by the second EGR valve 174, which in turn may be commanded by the controller 110 (FIG. 1). Generally, the second portion of EGR gas has a greater temperature than the downstream first mixed gas. As such, the resulting second mixed gas (or intake gas) may have a greater temperature than the downstream first mixed gas and a lower temperature than the second portion of EGR gas.

The second mixed gas (or intake gas) is directed to the intake manifold 144, which as noted above, distributes the intake gas to the cylinders of the engine 120 for mixture, ignition, and combustion with fuel from the fuel arrangement 130.

As noted above, the intake heat exchanger 150 may operate to warm the mixture of charge air and EGR gas during starting conditions. In other words, during these initial operating conditions, the coolant from the engine 120 may be at a higher temperature than the mixture of charge air and EGR gas. However, during typical operating conditions, the intake heat exchanger 150 may operate to cool the mixture of charge air and EGR gas. As one example collection of temperatures within the power system 108, the ambient temperature of into the air intake arrangement 140 may be approximately 15° C., and upon the compression that increases the temperature, the charge air temperature upstream of the first mixer 146 may be approximately 170° C. The exhaust gas directed from the exhaust manifold 162 to the EGR system 170 may be approximately 650° C. Upon mixing the charge air and the EGR gas, the temperature of the resulting mixture upstream of the first heat exchanger 150 may be approximately 300°, and upon cooling in the intake heat exchanger 150, the mixed charge air may have a temperature of approximately 100° C. Upon being further mixed with additional EGR gas at the second mixer 154, the resulting intake gas directed to the intake manifold 144 is approximately 120° C., which is an advantageous temperature for ignition and combustion of the low cetane fuel of the fuel arrangement 130. Generally, such temperatures, particularly for auto-ignition, may also depend on the compression ratio achieved in the piston-cylinder sets. For example, a compression ratio of around 15 may require an intake temperature of approximately 130° C., while a higher compression ratio of around 20 may require an intake temperature of approximately 115° C.

As such, the arrangement of this power system 108 provided improvements with respect to both high and low load operating conditions. For example, at low loads a mixed gas heat exchanger may heat the incoming charge air, which reduces the amount of hot EGR needed to reach the intake manifold temperature; and at high loads, additional EGR gas may be mixed with the charge air and flow with the charge air through the mixed gas cooler, thereby enabling higher rates of EGR at these higher load points (and lower NOx emission) while maintaining the desired intake manifold temperature.

Generally, operation of this power system 108 (as well as other power systems discussed herein) enables increased flexibility in the ranges of EGR that may be provided to the engine 120 while maintaining the desired intake air temperature. At idle and very low loads, when the engine exhaust temperature is lowest, a maximum rate of hot EGR may be needed to reach the intake air temperature requirement, which may reach up to 50% hot EGR. As the power increases and exhaust temperature rises, the rate of hot EGR will decrease. At some point (e.g., around 25% load), the EGR valve allowing EGR into the mixed gas cooler may be opened, thereby allowing EGR into the mixed gas cooler to increase the overall EGR percentage into the engine, which will lower the NOx emissions of the engine 120. As power increases further, less hot EGR is needed and more EGR into the mixed gas cooler may be added to achieve an optimal balance point of fuel economy and NOx emissions. At high and peak loads, only the smallest amount of hot EGR is needed and the EGR into the mixed gas cooler will be limited by the engines peak cylinder pressure limit or boost pressure limit.

As introduced above, the controller 110 (FIG. 1) may control operation of the engine 120, including the fuel arrangement 130 and air intake arrangement 140, as well as various other cooperating systems and components. In particular, the controller 110 may selectively command the nature of the air being directed into the air intake manifold 144 to provide reliable ignition and combustion within the engine 120 under all appropriate conditions. Generally, the controller 110 (FIG. 1) may be in communication with the various valves 148, 172, 174, engine 120, sensors, and other associated components to collect information about operation of the power system 108 and to implemented or command modification and/or maintenance of such operation.

The power system 108 depicted in FIG. 2 is merely one example of a power system that may utilize a heat exchanger for heating and/or cooling charge air and/or a mixture of charge air and EGR gas prior to introduction into the intake manifold for ignition and combustion. Additional examples of power system are depicted in FIGS. 3 and 4.

Figure 3:
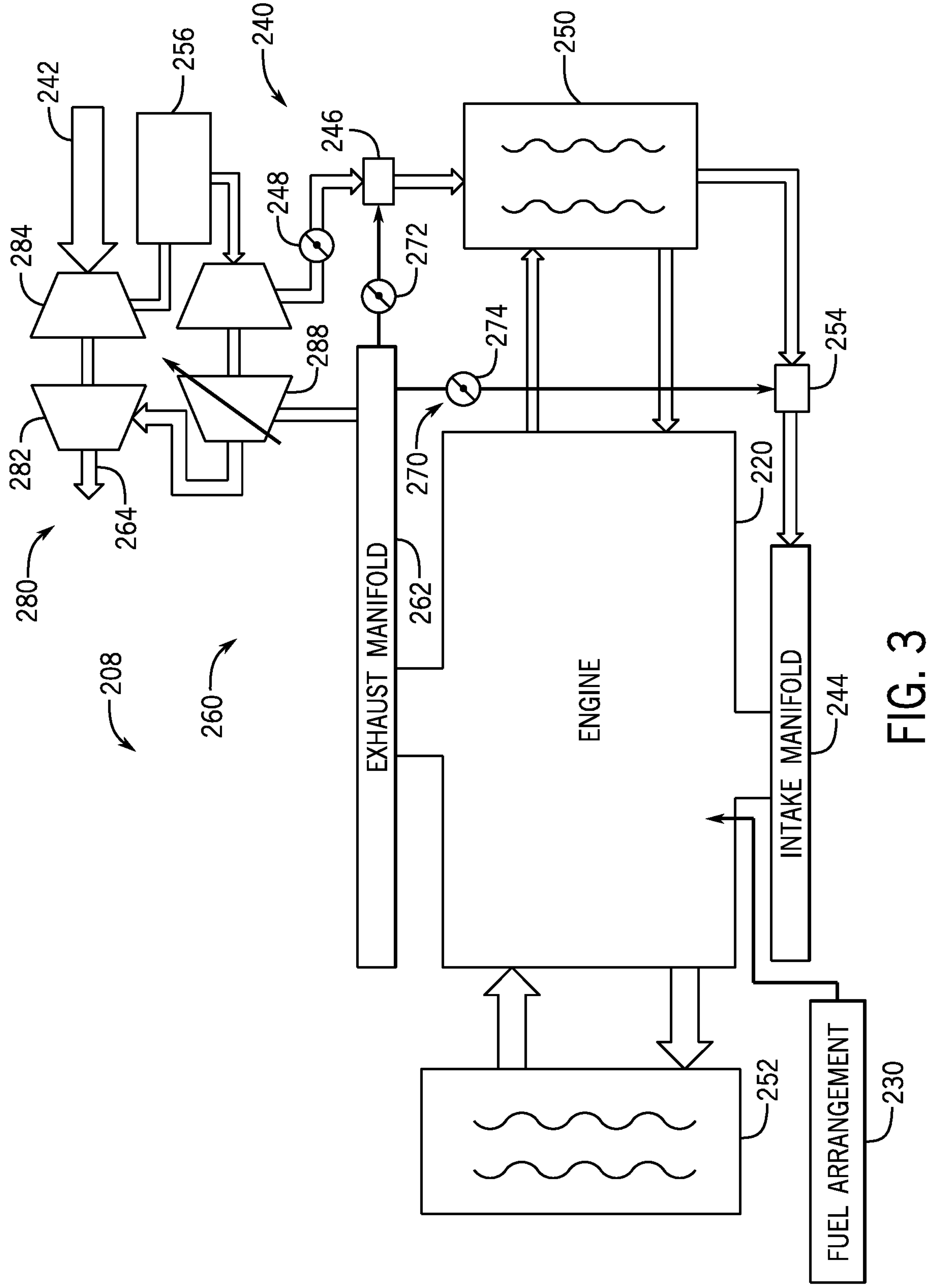
FIG. 3 is a simplified schematic diagram of a power system in accordance with a further example embodiment.
Figure 4:
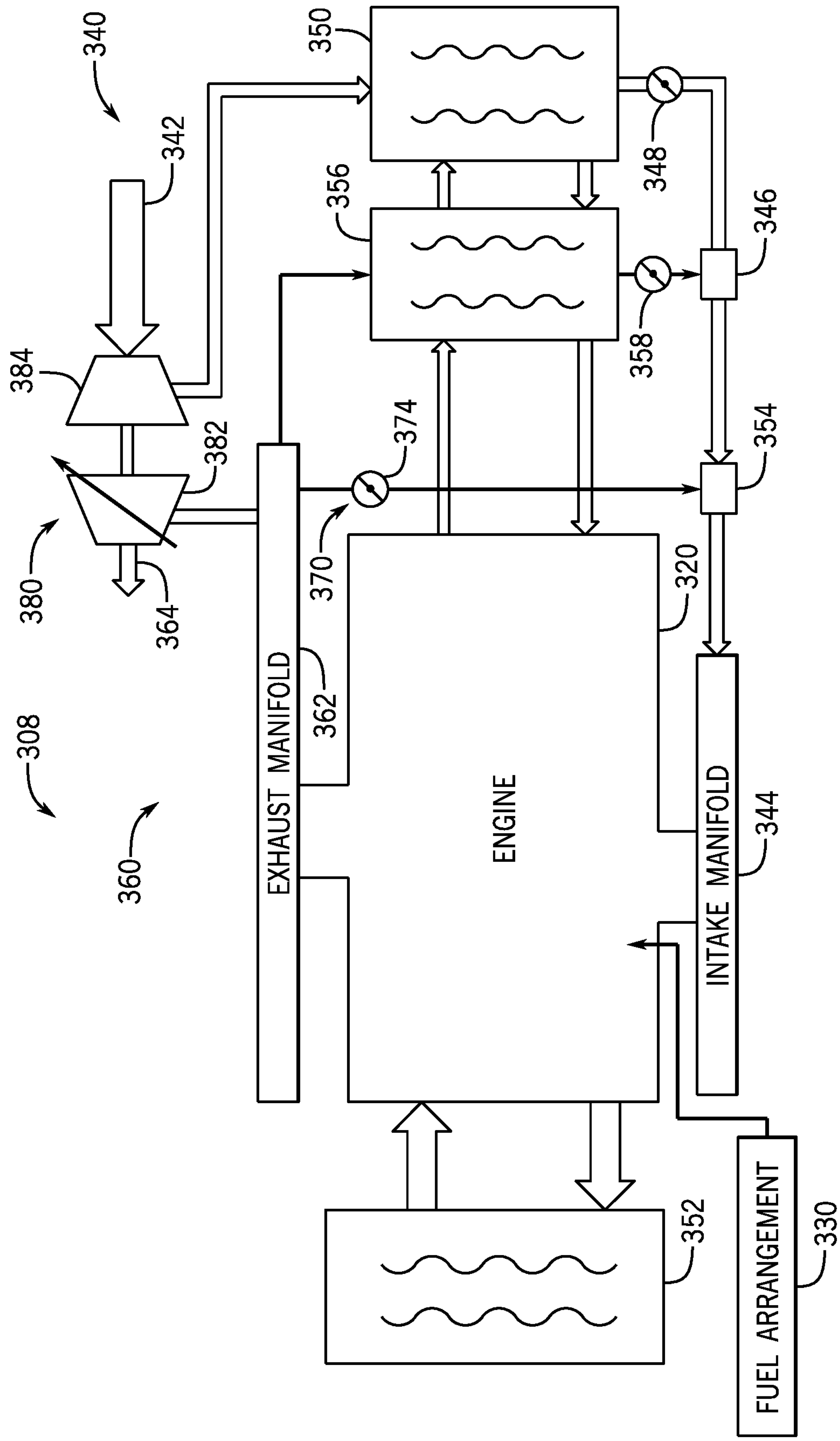
FIG. 4 is a simplified schematic diagram of a power system in accordance with a another example embodiment.

Reference is now made to FIG. 3, which is a schematic illustration of the power system 208 for providing power to a work vehicle, such as the work vehicle 100 of FIG. 1. Unless otherwise noted, the characteristics of the power system 108 discussed with reference to FIG. 2 are applicable to the power system 208 of FIG. 3.

As above, the power system 208 includes an engine 220 configured to combust a mixture of fuel from a fuel arrangement 230 and air from an air intake arrangement 240 to generate power for propulsion and various other systems, thereby generating an exhaust gas that is accommodated by an exhaust arrangement 260. As also introduced above, various aspects of the power system 208 may be operated by the controller (e.g., controller 110 of FIG. 1) based on operator commands and/or operating conditions. Further, as above, the engine 220 is primarily an engine that utilizes low cetane fuels, such as ethanol provided fuel for combustion by the fuel arrangement 230.

The air intake arrangement 240, in this example, may include an intake conduit 242 and an air intake manifold 244; and the exhaust arrangement 260 may include an exhaust manifold 262 and an exhaust conduit 264. The power system 208 may include an exhaust gas recirculation (EGR) system 270 and dual turbochargers 280, each of which may have at least portions that may also be considered part of (or otherwise cooperate with) the air intake arrangement 240 and/or the exhaust arrangement 260.

Generally, the EGR system 270 is configured to direct at least a first portion of exhaust gas back to the air intake arrangement 240 as EGR gas while at least a second portion of the exhaust gas is directed through aspects of the dual turbochargers 280 and out of the vehicle via the exhaust conduit 264 as vehicle exhaust. The EGR system 270 may include one or more EGR valves 272, 274 that operate to control the various flows of EGR gas and/or exhaust gas. Additional details regarding the EGR gas and/or EGR system 270 are provided below.

The dual turbochargers 280, in this example, are formed by two sets of compressors 284, 286 and turbines 282, 288. In particular, exhaust gas from the exhaust manifold 262 is directed through and drives turbine 288 and is subsequently directed through and drives turbine 282 before being directed out of the power system 208 via exhaust conduit 264. Turbine 282 is coupled to and drives compressor 284, and turbine 288 is coupled to and drives compressor 286. As a result, the incoming intake air is compressed twice by the dual turbochargers 280. In one example, the compressor 286 and turbine 288 may be considered a high-pressure turbocharger, and the compressor 284 and turbine 282 may be considered a low-pressure turbocharger. In some examples, a cooler 256 may be provided to cool the air between compressor 284 and compressor 286.

Returning to the air intake arrangement 240, the compressed charge air from the turbochargers 280 may be directed into a first mixer 246 and mixed with at least a portion (e.g., a first portion) of the EGR gas from the EGR system 270. As shown, the amount of compressed air directed into the first mixer 246 may be controlled by an air throttle valve 248, and the amount of the first portion of EGR gas may be controlled the first EGR valve 272. The relatively hot temperature of the first portion of EGR gas operates to increase the temperature of the charge air in the mixer 246. The mixture of charge air and EGR gas (or "upstream first mixed gas") is directed into an intake heat exchanger 250.

In this example, the intake heat exchanger 250 is configured to direct engine coolant into proximity with the first mixed gas such that the fluids exchange heat with one another. In particular, the intake heat exchanger 250 may be a jacket water (or other coolant) heat exchanger 250 in which engine coolant is received by the intake heat exchanger 250 from the engine 220, placed in proximity with the first mixed gas to facilitate the heat exchange, and then directed back to the engine 220. Depending on the relative temperatures of the engine coolant and the first mixed gas, the intake heat exchanger 250 may operate as a cooler or a heater relative to the first mixed gas. Briefly, the power system 208 may additionally include a second heat exchanger (or radiator) 252 to facilitate cooling of the engine 220 via circulation of the coolant over a cooling mechanism, such as air-cooled fins.

Returning to the air intake arrangement 240, downstream of the intake heat exchanger 250, the first mixed gas (or "downstream first mixed gas") is directed into a second mixer 254, which selectively additionally receives a further portion (or second portion) of EGR gas. The amount of second portion of EGR gas directed to the second mixer 254 may be controlled by the second EGR valve 274, which in turn may be commanded by a controller (e.g., controller 110 of FIG. 1). Generally, the second portion of EGR gas has a greater temperature than the downstream first mixed gas. As such, the resulting second mixed gas (or intake gas) may have a greater temperature than the downstream first mixed gas and a lower temperature than the second portion of EGR gas. The second mixed gas (or intake gas) is directed to the intake manifold 244, which as noted above, distributes the intake gas to the cylinders of the engine 220 for mixture, ignition, and combustion with fuel from the fuel arrangement 230.

As noted above, the intake heat exchanger 250 may operate to warm the mixture of charge air and EGR gas during starting conditions. In other words, during these initial operating conditions, the coolant from the engine 220 may be at a higher temperature than the mixture of charge air and EGR gas. However, during typical operating conditions, the intake heat exchanger 250 may operate to cool the mixture of charge air and EGR gas. As one example collection of temperatures within the power system 108, the ambient temperature of into the air intake arrangement 240 may be approximately 15° C., and upon compression by compressors 284, 286, the charge air temperature upstream of the first mixer 246 may be approximately 250° C. The exhaust gas directed from the exhaust manifold 262 to the EGR system 370 may be approximately 650° C. Upon mixing the charge air and the EGR gas, the temperature of the resulting mixture upstream of the first heat exchanger 250 may be approximately 300° C., and upon cooling in the intake heat exchanger 250, the mixed charge air may have a temperature of approximately 100° C. Upon being further mixed with additional EGR gas at the second mixer 254, the resulting intake gas directed to the intake manifold 244 is approximately 120° C., which is an advantageous temperature for ignition and combustion of the low cetane fuel of the fuel arrangement 230. Generally, such temperatures, particularly for auto-ignition, may also depend on the compression ratio achieved in the piston-cylinder sets.

Reference is now made to FIG. 4, which is a schematic illustration of a further power system 308 for providing power to a work vehicle, such as the work vehicle 100 of FIG. 1. Unless otherwise noted, the characteristics of the power system 108 discussed with reference to FIG. 2 are applicable to the power system 308 of FIG. 4.

As above, the power system 308 includes an engine 320 configured to combust a mixture of fuel from a fuel arrangement 330 and air from an air intake arrangement 340 to generate power for propulsion and various other systems, thereby generating an exhaust gas that is accommodated by an exhaust arrangement 360. As also introduced above, various aspects of the power system 308 may be operated by the controller (e.g., controller 110 of FIG. 1) based on operator commands and/or operating conditions. Further, as above, the engine 320 is primarily an engine that utilizes low cetane fuels, such as ethanol provided for combustion by the fuel arrangement 330.

The air intake arrangement 340, in this example, may include an intake conduit 342 and an air intake manifold 344; and the exhaust arrangement 360 may include an exhaust manifold 362 and an exhaust conduit 364. The power system 308 may include an exhaust gas recirculation (EGR) system 370 and a turbocharger 380, each of which may have at least portions that may also be considered part of (or otherwise cooperate with) the air intake arrangement 340 and/or the exhaust arrangement 360.

Generally, the EGR system 370 is configured to direct at least a first portion of exhaust gas back to the air intake arrangement 340 as EGR gas while at least a second portion of the exhaust gas is directed through aspects of the dual turbochargers 280 and out of the vehicle via the exhaust conduit 364 as vehicle exhaust. The EGR system 370 may include one or more EGR valves 374, 358 that operate to control the various flows of EGR gas and/or exhaust gas. In this example, the EGR system 370 may have two "paths," e.g., a cooled path in which a first portion of EGR flow is directed through an EGR cooler 356 and a bypass path in which a second portion of EGR flow is directed around (and not through) the EGR cooler 356. Valves 358, 374 may be commanded (e.g., by controller 110 of FIG. 1) to control the amount of flow through and around the EGR cooler 356. The EGR cooler 356 may be any suitable device configured to lower the temperature of the recirculated gas. Generally, the EGR cooler 356 includes one or more recirculated gas passages and one or more coolant passages, arranged such that heat may be transferred from the recirculated gas to a cooperating fluid (e.g., air or liquid). Additional details regarding the EGR gas and/or EGR system 370 are provided below.

The turbocharger 380 generally functions to increase the amount of air subsequently directed into the engine 320 for improved engine efficiency and power input. In one example, the turbocharger 380 includes a turbine 382 that receives a portion (e.g., the second portion) of the exhaust gas, as introduced above. The turbocharger 380 further includes a compressor 384 that is driven by the turbine 382. The compressor 384 functions to compress the ambient or charge air that enters the air intake arrangement 340 via the intake conduit 342. In other examples, the turbocharger 380 may be supplemented with dual turbochargers (e.g., similar to those discussed above with reference to FIG. 3).

Returning to the air intake arrangement 340, the compressed charge air from the turbocharger 380 may be directed into an intake heat exchanger 350 that is configured to direct engine coolant into proximity with the charge air such that the fluids exchange heat with one another. In particular, the intake heat exchanger 350 may be a jacket water (or other coolant) heat exchanger 350 in which engine coolant is received by the intake heat exchanger 350 from the engine 320, placed in proximity with the charge air to facilitate the heat exchange, and then directed back to the engine 320. Depending on the relative temperatures of the engine coolant and the charge air, the intake heat exchanger 350 may operate as a cooler or a heater relative to the charge air. As shown, the amount of compressed charge air directed into through the first heat exchanger 350 may be controlled by an air throttle valve 348. In one example, the intake heat exchanger 350 and the EGR cooler 356 may have a common coolant circuit (e.g., with engine coolant), while in other examples, the intake heat exchanger 350 and the EGR cooler 356 may have separate coolant circuits. Briefly, the power system 308 may additionally include a second heat exchanger (or radiator) 352 to facilitate cooling of the engine 320 via circulation of the coolant over a cooling mechanism, such as air-cooled fins.

Downstream of the air intake heat exchanger 350 and the EGR cooler 356, the cooled EGR gas and the intake charge air are mixed within a first mixer 346. The relatively hot temperature of the first portion of EGR gas operates to increase the temperature of the charge air in the mixer 346. The mixture of charge air and EGR gas (or "first mixed gas") is directed into a second mixer 354. In effect, in this example, the EGR and charge intake air may be separately cooled prior to mixing in the first mixer 346.

In addition to the first mixed gas, the second mixer 354 selectively additionally receives a further portion (or second portion) of EGR gas. The amount of second portion of EGR gas directed to the second mixer 354 may be controlled by the second EGR valve 374, which in turn may be commanded by a controller (e.g., controller 110 of FIG. 1). Generally, the second portion of EGR gas has a greater temperature than the downstream first mixed gas. As such, the resulting second mixed gas (or intake gas) may have a greater temperature than the downstream first mixed gas and a lower temperature than the second portion of EGR gas. The second mixed gas (or intake gas) is directed to the intake manifold 344, which as noted above, distributes the intake gas to the cylinders of the engine 320 for mixture, ignition, and combustion with fuel from the fuel arrangement 330.

As noted above, the intake heat exchanger 350 may operate to warm the charge air during starting conditions. In other words, during these initial operating conditions, the coolant from the engine 320 may be at a higher temperature than the charge air. However, during typical operating conditions, the intake heat exchanger 350 may operate as to cool the charge air. As compared to other examples, the heat exchanger 350 in this example may use lower cost materials, such as aluminum, since the heat exchanger 350 does not process any portion of the EGR gas. Additionally, the heat exchanger 350 may be smaller than other examples, mounted on the engine 120, and may obviate the use of a vehicle air to air charge cooler. In any event, the heat exchanger 350, as above, provide an advantageous dual purpose of both heating the charge air at low loads and cooling the charge air at high loads.

As one example collection of temperatures within the power system 308, the ambient temperature of into the air intake arrangement 340 may be approximately 15° C., and upon compression, the charge air temperature upstream of the first heat exchanger 350 may be approximately 170° C. and cooled by the first heat exchanger 350 to approximately 100° C. The exhaust gas directed from the exhaust manifold 362 to the EGR system 370 may be approximately 650° C. Upon mixing the charge air and the EGR gas, the temperature of the resulting mixture upstream of the first heat exchanger 350 may be approximately 110° C. Upon being further mixed with additional EGR gas at the second mixer 354, the resulting intake gas directed to the intake manifold 344 is approximately 120° C., which is an advantageous temperature for ignition and combustion of the low cetane fuel of the fuel arrangement 330. Generally, such temperatures, particularly for auto-ignition, may also depend on the compression ratio achieved in the piston-cylinder sets.

Accordingly, the power systems discussed above provide the ability to use ethanol and other low cetane fuels in a diesel-type, compression ignition engine over a range of conditions, including cold starts and low load conditions. Overall, the power systems described herein result in a platform architecture that may provide improved fuel consumption, higher performance, and reduced criteria pollutants over a relatively wide temperature operating window. As noted, the heat exchanger may operate as a cooler at high loads and a heater at low loads. In particular, at relatively light loads, this may enable the use of less EGR gas than may otherwise be needed for this purpose at the second mixer, thereby enabling more efficient use of EGR gas through the engine and the resulting lower NOx emissions and advantageous ignition and combustion characteristics. This may also enable increased exhaust flow for the turbochargers.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
- a compression ignition engine configured to receive and combust intake gas to generate mechanical power and exhaust;
- an EGR (exhaust gas recirculation) arrangement configured to receive a portion of the exhaust generated by the compression ignition engine as EGR gas;
- a first mixer configured to mix a first portion of the EGR gas and charge air as mixed gas;
- an intake heat exchanger with coolant circulating therein and configured to exchange heat between the coolant and the charge air or the mixed gas;
- a second mixer configured to mix a second portion of the EGR gas and the mixed gas as the intake gas; and
- an intake manifold configured to direct the intake gas from the second mixer into the compression ignition engine for combustion.

2. The power system of claim 1, wherein the compression ignition engine is configured to operate with a low cetane fuel.

3. The power system of claim 2, wherein the compression ignition engine is configured to operate with fuel having a cetane value of less than 40.

4. The power system of claim 3, wherein the intake heat exchanger is positioned downstream of the first mixer such that the heat is exchanged between the coolant circulating within the intake heat exchanger and the mixed gas.

5. The power system of claim 4, wherein, under a first set of conditions, the intake heat exchanger is configured to heat the mixed gas.

6. The power system of claim 5, wherein, under a second set of conditions, the intake heat exchanger is configured to cool the mixed gas.

7. The power system of claim 3, further comprising:
- a first EGR valve configured to control an amount of the first portion of the EGR gas directed to the first mixer; and
- a second EGR configured to control an amount of the second portion of the EGR gas directed to the second mixer.

8. The power system of claim 7, further comprising a controller coupled to the first EGR valve and the second EGR valve and configured to control the first EGR valve and the second EGR valve such that the intake gas has a temperature such that, upon compression, the intake gas auto-ignites.

9. The power system of claim 1, further comprising an intake arrangement configured to intake the charge air;
- wherein the intake arrangement includes a compressor configured to compress the charge air upstream of the first mixer.

10. The power system of claim 9, further comprising an exhaust arrangement configured to receive a first portion of the exhaust generated by the compression ignition engine;
- wherein the exhaust arrangement includes a turbine driven by the first portion of the exhaust and rotationally coupled to drive the compressor.

11. The power system of claim 10, wherein the intake arrangement includes a second compressor and the exhaust arrangement includes a second turbine that collectively form dual turbochargers.

12. The power system of claim 11, wherein the intake arrangement further includes an interstage cooler positioned between the compressors to cool the charge air.

13. The power system of claim 1, further comprising a radiator configured to cool the coolant.

14. The power system of claim 1, wherein the EGR arrangement further comprises an EGR cooler configured to cool the EGR gas upstream of the first mixer.

15. The power system of claim 14, wherein the EGR cooler and the intake heat exchanger are separate heat exchangers.

16. A work vehicle, comprising:
- a chassis;
- a drive assembly supported on the chassis; and
- a power system supported on the chassis and configured to power the drive assembly, the power system comprising:
  - a compression ignition engine configured to receive and combust intake gas to generate mechanical power and exhaust;
  - an EGR (exhaust gas recirculation) arrangement configured to receive a portion of the exhaust generated by the compression ignition engine as EGR gas;
  - a first mixer configured to mix a first portion of the EGR gas and charge air as mixed gas;
  - an intake heat exchanger with coolant circulating therein and configured to exchange heat between the coolant and the charge air or the mixed gas;
  - a second mixer configured to mix a second portion of the EGR gas and the mixed gas as the intake gas; and
  - an intake manifold configured to direct the intake gas from the second mixer into the compression ignition engine for combustion.

17. The work vehicle of claim 16, wherein the compression ignition engine is configured to operate with a low cetane fuel.

18. The work vehicle of claim 17, wherein the compression ignition engine is configured to operate with fuel having a cetane value of less than 40.

19. The work vehicle of claim 18, wherein the intake heat exchanger is positioned downstream of the first mixer such that the heat is exchanged between the coolant within the intake heat exchanger and the mixed gas.

20. The work vehicle of claim 19, wherein, under a first set of conditions, the intake heat exchanger is configured to heat the mixed gas, and wherein, under a second set of conditions, the intake heat exchanger is configured to cool the mixed gas.

* * * * *